Sept. 12, 1967                J. M. KALMANEK                3,341,262
RECIRCULATING BEARING
Filed Dec. 21, 1964

Inventor
Joseph M. Kalmanek
By
Brown, Jackson,
Boettcher & Dienner        Att'ys.

United States Patent Office 3,341,262
Patented Sept. 12, 1967

3,341,262
RECIRCULATING BEARING
Joseph M. Kalmanek, Cicero, Ill., assignor, by mesne assignments, to Scully-Jones Company, a corporation of Delaware
Filed Dec. 21, 1964, Ser. No. 419,721
8 Claims. (Cl. 308—6)

The present invention relates to a recirculating bearing of the type having rollers with a reduced diameter central portion and having guide means which cooperate with the reduced diameter central portion to assist in maintaining the rollers in proper alignment.

It is known in the art to provide a recirculating way bearing embodying a plurality of rollers each having an annular groove or reduced diameter central portion midway between its ends. Such a bearing is disclosed in United States Patent 3,003,828 which issued to James A. Stark on Oct. 10, 1961. In the Stark bearing, the rollers move around an oblong race body, one side of which constitutes a loaded zone and the other side a return zone. An outer fixed retainer rail is provided which extends longitudinally along the load side of the race outwardly of the reduced diameter central portions of the rollers, and a similar fixed outer retaining rail is provided at the return side of the race. In each instance the fixed outer guide rail is a rigid member which extends along the path of movement of the rollers and is disposed in the annular groove or recess of each roller for retaining the rollers and guiding the same. Thus, the rollers are controlled by fixed outer guide rails when they are on the load side and when they are on the opposite return side of the reciprocating way bearing. End caps are provided at each of the two ends of the race body and such end caps define closed arcuate paths for conducting the rollers from the load side of the bearing to the opposite return side and vice versa. There is no outer retaining rail for controlling the rollers while they are moving in the arcuate paths provided in the end cap members, but because such paths are enclosed, the rollers are retained and are caused to move back to one of the straight portions of the race where the rigid outer retaining rails are provided.

One of the problems encountered with known recirculating way bearings of the type described above is due to the fact that the rigid longitudinal retaining rails do not produce optimum alignment of the rollers in all bearing applications. When a roller becomes misaligned, a shoulder adjacent the central recess therein will engage the outer retaining rail, and because the retaining rail is stationary while the roller is moving, appreciable sliding friction will be created. In other words, when a roller becomes misaligned or tilted, it will roll in the inclined direction which it is facing until it abuts against the fixed retaining rail or guide rail which prevents further rolling of the roller in such inclined direction. Thereafter, the roller will be forced to move along the path defined by the edge of the rail, but the roller will often remain tilted and will thus be moved in a direction which is not perpendicular to its axis. Under such circumstances, the movement of the roller will not constitute a true roll, and appreciable sliding friction will be created in addition to the usual rolling friction.

It is an object of the present invention to provide a recirculating bearing which exhibits improved roller alignment characteristics and reduced friction so as to provide smoother operation and substantially longer life.

A more specific object of the invention is to provide a recirculating bearing having improved outer guide and retaining means for retaining the rollers against the race body and maintaining them in proper alignment as they move around such body.

In furtherance of the foregoing objects, I provide a recirculating way bearing having a plurality of rollers which travel around a race body having a load zone and a return zone, and I provide such rollers with an annular groove or recess midway between their end portions. In combination therewith, I provide outer guide and retaining means in the form of an elastic tension band which extends completely around the race body to encompass all of the rollers thereon and which is disposed in the central recesses of the rollers. The elastic tension band retains the rollers in close association with the race body and it also functions to maintain the rollers in proper alignment. The elastic band comprises in effect a movable guide and retaining member since it moves around the race body with the rollers, and it will also float laterally to some extent when a roller which has become misaligned engages the edge of the band.

Other objects and advantages of the invention will be apparent from the following description thereof.

Now in order to acquaint those skilled in the art with the manner of practicing and utilizing my invention, I shall describe in conjunction with the accompanying drawings a preferred embodiment of the invention.

Figure 1:
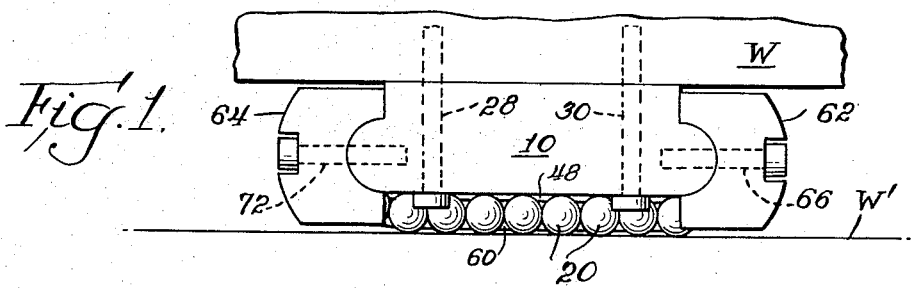
FIGURE 1 is a side elevational view showing a recirculating way bearing constructed in accordance with the present invention, the bearing being shown between a pair of ways and attached to one of the ways to illustrate the use thereof.
Figure 3:
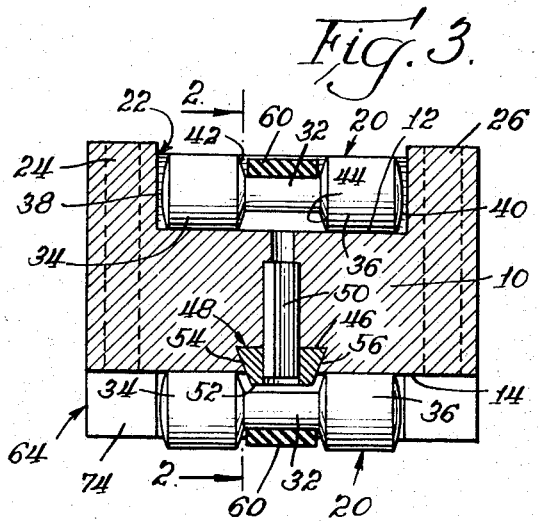
FIGURE 3 is a transverse vertical sectional view taken approximately along the line 3—3 of FIGURE 2.
Figure 4:
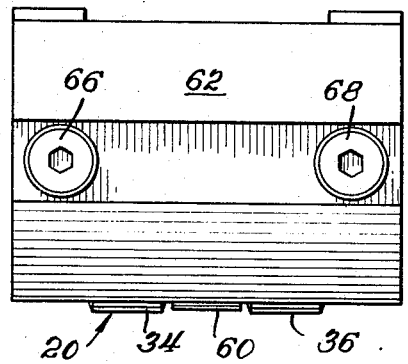
FIGURE 4 is an end elevational view looking substantially in the direction of the arrows 4—4 of FIGURE 2.

Referring now to the drawings, there is shown a race body 10 having an upper return surface 12 and a lower load surface 14. The race body 10 is provided with arcuate generally semicircular surfaces at each of its end portions 16 and 18, and the flat surfaces 12 and 14 together with the arcuate surfaces 16 and 18 comprise a continuous oblong track for a plurality of recirculating rollers 20. As shown in FIGURE 3, the race body 10 appears in transverse cross section as a rectangle with a central slot or recess 22 extending longitudinally along the upper return side thereof so as to define a pair of upwardly projecting side walls 24 and 26, the base of the recess being the upper return surface 12. The rollers 20 are of a length slightly less than the distance between the side walls 24 and 26 so that when moving on the return surface 12 the rollers will travel between the side walls 24 and 26. In addition, the side walls 24 and 26 project above the flat return surface 12 by a distance which exceeds the diameter of the rollers 20. Accordingly, the bearing may be attached to a way W by a pair of screws 28 and 30 as shown in FIGURE 1 with the rollers in the load zone bearing on a way W′, and it will be understood that with the upper ends of the walls 24 and 26 engaged against the way W the rollers 20 moving over the return surface 12 will be spaced from the way W and will not be under load.

The rollers 20 each comprise an elongated generally cylindrical roller member having a length substantially greater than its diameter, and having a reduced diameter central portion 32 and a pair of larger diameter outer portions 34 and 36 on either side of the central portion, the outer portions being of course the load carrying portions of the rollers. The opposite ends of each roller 20 may be rounded as shown at 38 and 40, and the rollers may also be beveled somewhat at the annular shoulders 42 and 44 which are formed at opposite ends of the reduced diameter central portion 32.

The flat load surface 14 on the underside of the race body 10 has a central longitudinal dovetail slot 46 formed therein, and an inner roller guide rail 48 is inserted in the slot 46 and secured in position by a rollpin 50. The central inner guide rail 48 comprises an outer surface 52 and inclined side surfaces 54 and 56, and the guide rail projects downwardly beyond the flat load surface 14 so as to extend into the recesses of the rollers between the bearing portions 34 and 36. In other words, the inner guide rail 48 is a rectilinear member which extends longitudinally substantially the full length of the load surface 14, and the rollers 20 moving on the load surface 14 straddle the guide rail 48 with the load bearing roller portions 34 and 36 rolling on the surface 14 on opposite sides of the guide rail.

Figure 2:
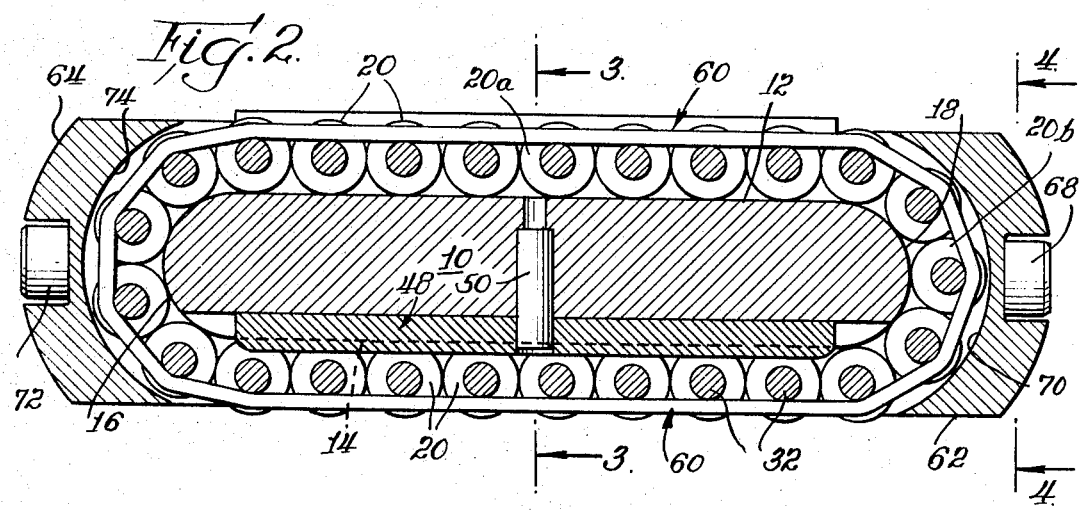
FIGURE 2 is an enlarged longitudinal vertical sectional view of the bearing of the present invention, taken approximately along the line 2—2 of FIGURE 3, showing an elastic tension band which extends around all of the rollers and functions both as a retaining member and also as a guide member to maintain the rollers in proper alignment.

It is an important feature of the present invention that an elastic tension band 60 is stretched around the entire race body 10 so as to encompass all of the rollers 20 associated with the race body. The elastic tension band 60 may be made of rubber or other suitable elastic material, and it is of a width which is approximately equal to the length of the reduced diameter central portion 32 of each roller 20. Accordingly, the elastic tension band is extended around all of the rollers 20 and is disposed in the recesses between the roller bearing portions 34 and 36 so as to overlie the reduced diameter portions 32. The elastic band 60 is under tension and thus tends to hold the rollers 20 in engagement with the continuous track provided by the race body and comprising the surfaces 12, 14, 16 and 18. The force which the band 60 exerts in holding the rollers 20 against the race body 10 will vary around the track due to the oblong shape of the latter. In the particular embodiment being described, a roller in the approximate position shown at 20a in FIGURE 2 will be urged against the flat track wall 12 by a relatively small force, whereas a roller in the approximate position shown at 20b will be urged against the arcuate track wall 18 by a substantially greater force. By way of example, in one highly satisfactory embodiment the ratio of the larger force to the smaller force is approximately 15 to 1. Preferably, tthe ratio should be at least 4 to 1.

A pair of end caps 62 and 64 are secured to oppsite ends of the race body 10. The end cap 62 is secured to the end of the race body by a pair of cap screws 66 and 68 which pass through the end cap and extend into the arcuate portion 18 of the race body at opposite sides thereof laterally outwardly of the track portion on which the rollers 20 move. The end cap 62 has an inner arcuate surface 70 which is spaced from the surface 18 on the race body so as to form therewith a closed track for conducting the rollers 20 between the return surface 12 and the load surface 14. The opposite end cap 64 is similarly secured to the race body 10 by cap screws such as shown at 72, and the end cap 64 is provided with an inner arcuate surface 74 which is spaced from the arcuate surface 16 on the race body so as to form therewith a closed track for conducting the rollers between the return surface 12 and the load surface 14. Because the elastic tension band 60 will itself retain the rollers 20 against the arcuate end surfaces 16 and 18 as the rollers pass thereover, the end caps 62 and 64 are not required for this purpose. However, such end caps are provided as a safety feature in the embodiment disclosed, and it will be understood that they prevent the possibility that under extreme operating conditions one of the rollers might be caused to "pop" or be squeezed outwardly away from the track thus overcoming the retaining force exerted by the elastic band. It should also be noted that the guide rail 48 may be eliminated in certain applications since the elastic tension band 60 is capable of controlling the rollers 20, although the guide rail 48 is also included as a safety feature in the embodiment described.

In operation, the rollers 20 disposed on the load surface 14 are subjected to load and are rolled over the surface 14 in a continuous manner. It will be assumed that the rollers 20 are moving in a clockwise direction as viewed in FIGURE 2. Thus, the rollers move under load over the flat surface 14, and while on the surface 14 they straddle the fixed inner guide rail 48. The rollers then move out of the load zone and around the arcuate surface 16, after which they move along the flat return surface 12. The rollers then move around the arcuate end surface 18 and finally they reenter the load zone and again move along the load surface. At all times the rollers 20 are retained on the continuous track by the elastic tension band 60 which encompasses all of the rollers. The elastic tension band 60 comprises a movable guide and retaining means, since the band will move around the race body 10 with the rollers, usually at the approximate linear speed of the rollers.

The elastic tension band 60 of the present invention has been found to be extremely effective in maintaining the rollers 20 in proper alignment as the rollers move around the race body 10. The band 60 by virtue of its width and its pull equalizing tendency straightens the rollers in relation to each other and the race surface, the width of the band being approximately equal to the length of the reduced diameter roller portion or annular groove 32 so that the band fits within such groove and is disposed between the roller load-carrying portions 34 and 36. The moving tension band 60 tends to carry the rollers 20 when such rollers are out of the load zone, i.e., when the rollers are not moving under load on the race surface 14. The rollers 20 do not rotate appreciably when they are out of the load zone, but they are carried along by the band 60 and maintained in proper alignment thereby.

It is important to note that the band 60 encompasses all of the rollers 20 on the race body 10 and since the band is under tension it gathers such rollers together and tends to bring each roller into full length contact with the rollers on either side thereof. Because the band gathers the rollers together in this manner, it maintains the rollers in a straightened condition. The gathering effect of the band 60 is less pronounced in the load zone, i.e., as to rollers which are moving under load on the race track portion 14, and thus is primarily effective on rollers disposed at the arcuate end portions 16 and 18 and at the return surface 12. Since the retaining force exerted by the tension band 60 is greatest at the end portions of the race where the rollers are disposed on the arcuate end surfaces 16 and 18, the straightening tendency is most pronounced in these areas, but it is also effective as to rollers on the return surface 12.

While as described above the rollers 20 are maintained by the band 60 in their straightened full length contact positions throughout the unloaded portion of the circuit with relatively little rotation taking place, the effect of the band on rollers in the load zone is somewhat different. As a roller enters the load zone, it enters a space which is slightly smaller than the roller diameter. That is, the rollers are compressed under the load W', and when a roller first enters the load zone it is squeezed and given positive rotation whereas the following roller delays slightly until firm contact takes place. Accordingly, the rollers 20 tend to be spaced very small distances apart when rolling under load on the load surface 14 (although no attempt has been made to illustrate such slight spacing in the drawings), which contributes to the independence of the rollers in the load zone and to the fact that during such portion of their travel they are primarily controlled by the load itself, i.e., the way W' in FIGURE 1. Consequently, the usual problem of reverse rotation of alternate contacting rollers is virtually eliminated and the load itself tends to rotate each roller in the same direction and to maintain the rollers in a straightened condition, whereas out of the load zone the tension band 60 gathers the rollers together and keeps them in proper alignment. It is partly due to the radial flexibility of the tension band 60 that the rollers 20 are permitted to move slightly apart as they enter the load zone thereby virtually eliminating the reverse rotation and rubbing normally found with contacting rollers.

It will be understood that in addition to being somewhat flexible radially, the tension band 60 is also flexible in a lateral or axial direction, i.e., in a direction parallel to the axes of the rollers 20. Because of its lateral flexibility the elastic tension band 60 allows the rollers limited axial displacement relative to one another when any misalignment of the rollers occurs thereby minimizing development of substantial lateral forces or side thrust such as usually accompanies even minute roller misalignment. When a conventional fixed outer guide rail is used, a misaligned roller will engage the rail and then move along the edge of the rail in a tilted condition not only causing extensive sliding friction but also developing substantial side thrust, and it has been found that due in part to the lateral flexibility of the tension band of the present invention such problems have been virtually eliminated. The elastic tension band reduces the tendency of a roller to tilt and will permit limited relative lateral displacement of the rollers so as to eliminate side thrust.

In the foregoing discussion of the operation and advantages of the recirculating bearing of the present invention, emphasis has been placed on the manner in which the elastic tension band controls the rollers and maintains them in alignment. It is however important to understand that because of such function of the band the resulting bearing not only operates in a smoother and more efficient manner but also provides greatly increased life. Due to the lateral and radial flexibility of the band 60, the rollers 20 which are rolling under load across the load surface 14 are caused to follow a true rolling path, and substantially all sliding friction between the rollers and the track portion 14 and way surface W' is eliminated thereby reducing wear and extending the bearing life. Due to the fact that the retaining band 60 moves around the race track with the rollers 20, undesirable rubbing and skidding of the moving rollers against a fixed guide rail are also virtually eliminated.

It has further been found that the tension band 60 acts as an effective damper for the rollers so that the destructive effects of spindle or machine vibration are greatly mitigated. When recirculating way bearings of the type heretofore known having rigid retaining rails or the like have been used in applications where appreciable vibration is present, the resultant minute vibratory motion between the rollers and the contacting surfaces has often caused "fretting corrosion" and early failure of the bearing elements. "Fretting corrosion" is the corrosion produced at the areas of contact between the rollers and the race body and way surface when very slight vibratory sliding movements liberate minute particles which rust or oxidize rapidly and produce what is often referred to as "red dust" or "red mud." Tests have shown that the elastic tension band 60 of the present invention largely eliminates "fretting corrosion," and this is believed to be due to the vibration damping effect which the elastic band has on the rollers, thereby significantly reducing wear and increasing bearing life.

It will be understood that while the present invention has been illustrated in conjunction with an elastic tension band comprising a continuous endless rubber band generally rectangular in cross section, other forms of the band may be utilized, providing the band is elastic and is stretched over the rollers to encompass the same. Thus, while I have illustrated my invention in a preferred form, I do not intend to be limited to that form except insofar as the appended claims are so limited, since modifications coming within the scope of my invention will be readily suggested to others with my disclosure before them.

I claim:

1. In a recirculatnig way bearing, in combination, inner race means providing a continuous track, a plurality of rollers disposed on said track and movable around the same in substantially abutted relation to one another, said rollers being generally cylindrical and each having a reduced diameter central portion approximately midway between its ends, and an endless elastic tension band extending around the periphery of said track so as to overlie the reduced diameter central portions of said rollers and thereby maintain said rollers in close association with said track and in proper alignment thereon, said tension band being non-metallic and highly flexible both radially and laterally.

2. In a recirculating way bearing, in combination, inner race means providing a continuous track, a plurality of rollers disposed on said track and movable around the same in substantially abutted relation to one another, said rollers being generally cylindrical and each having a reduced diameter central portion approximately midway between its ends, and an endless elastic tension band of a width approximately equal to the length of said reduced diameter central portion of each of said rollers, said band being non-metallic and highly flexible both radially and laterally and extending around the periphery of said track so as to overlie the reduced diameter central portions of said rollers and thereby maintain said rollers in close association with said track and in proper alignment thereon.

3. In a recirculating way bearing, in combination, an inner race body providing a continuous track having a load zone and a return zone, a plurality of rollers disposed on said track and movable around the same in substantially abutted relation to one another, said rollers being generally cylindrical and each having a reduced diameter central portion approximately midway between its ends, and an endless elastic tension band of a width approximately equal to the length of said reduced diameter central portion of each of said rollers, said band being non-metallic and highly flexible both radially and laterally and extending around the periphery of said track so as to overlie the reduced diameter central portions of said rollers and thereby maintain said rollers in close association with said track and in proper alignment thereon.

4. In a recirculating way bearing, in combination, an inner race body providing a continuous oblong track having a substantially flat load side and a return side, a plurality of rollers disposed on said track and movable around the same in substantially abutted relation to one another, said rollers being generally cylindrical and each having a reduced diameter central portion approximately midway between its ends, and an endless elastic tension band of a width approximately equal to the length of said reduced diameter central portion of each of said rollers, said band being non-metallic and highly flexible both radially and laterally and extending around the periphery of said oblong track so as to overlie the reduced diameter central portions of said rollers and thereby maintain said rollers in close association with said track and in proper alignment thereon.

5. In a recirculating way bearing, in combination, an inner race body providing a continuous oblong track having a pair of oppositely disposed parallel sides, said sides being substantially flat and one comprising a load surface and the other a return surface, and a pair of oppositely disposed arcuate track end portions, said flat sides and said arcuate end portions together comprising said continuous track, a plurality of rollers disposed on said track in closely spaced approximately abutting relation to one another and movable around the track, said rollers being generally cylindrical and each having a reduced diameter central portion approximately midway between its ends, and an endless elastic tension band of a width approximately equal to the length of said reduced diameter central portion of each of said rollers, said band being non-metallic and highly flexible both radially and laterally and extending around the periphery of said oblong track so as to overlie the reduced diameter central portions of said rollers and thereby maintain said rollers in close association with said track and in proper alignment thereon.

6. In a recirculating way bearing, in combination, an inner race body providing a continuous oblong track having a pair of oppositely disposed parallel sides, said sides being substantially flat and one comprising a load surface and the other a return surface, and a pair of oppositely disposed arcuate track end portions, said flat sides and said arcuate end portions together comprising said continuous track, a plurality of rollers disposed on said track and movable around the same in substantially abutted relation to one another, said rollers being generally cylindrical and each having a reduced diameter central portion approximately midway between its ends, and an endless elastic tension band of a width approximately equal to the length of said reduced diameter central portion of each of said rollers and extending around the periphery of said oblong track so as to overlie the reduced diameter central portions of said rollers and thereby maintain said rollers in close association with said track and in proper alignment thereon, said endless band being non-metallic and highly flexible both radially and laterally and being under a predetermined tension so as to apply a relatively small force to a roller disposed approximately midway between the ends of one of said flat sides of the track and a substantially larger force to a roller disposed approximately at one of said arcuate track end portions, the ratio of said larger force to said smaller force being at least approximately 4 to 1.

7. In a recirculating way bearing, in combination, an inner race body providing a continuous oblong track having a pair of oppositely disposed parallel sides, said sides being substantially flat and one comprising a load surface and the other a return surface, and a pair of oppositely disposed arcuate track end portions, said flat sides and said arcuate end portions together comprising said continuous track, a plurality of rollers disposed on said track and movable around the same in substantially abutted relation to one another, said rollers being generally cylindrical and each having a reduced diameter central portion approximately midway between its ends, a stationary generally rectilinear guide rail extending longitudinally along said load surface and projecting therefrom so as to extend into the reduced diameter central portions of rollers moving on said load surface whereby the rollers straddle said guide rail, and an endless elastic tension band of a width approximately equal to the length of said reduced diameter central portion of each of said rollers, said band being non-metallic and highly flexible both radially and laterally and extending around the periphery of said oblong track so as to overlie the reduced diameter central portions of said rollers and thereby maintain said rollers in close association with said track and in proper alignment thereon.

8. In a recirculating way bearing, in combination, an inner race body providing a continuous oblong track having a pair of oppositely disposed parallel sides, said sides being substantially flat and one comprising a load surface and the other a return surface, and a pair of oppositely disposed arcuate track end portions, said flat sides and said arcuate end portions together comprising said continuous track, a plurality of rollers disposed on said track in closely spaced approximately abutting relation to one another and movable around the track, said rollers being generally cylindrical and each having a reduced diameter central portion approximately midway between its ends, a stationary generally rectilinear guide rail extending longitudinally along said load surface and projecting therefrom so as to extend into the reduced diameter central portions of rollers moving on said load surface whereby the rollers straddle said guide rail, and an endless elastic tension band of a width approximately equal to the length of said reduced diameter central portion of each of said rollers and extending around the periphery of said oblong track so as to overlie the reduced diameter central portions of said rollers and thereby maintain said rollers in close association with said track and in proper alignment thereon, said endless band being non-metallic and highly flexible both radially and laterally and being under a predetermined tension so as to apply a relatively small force to a roller disposed approximately midway between the ends of one of said flat sides of the track and a substantially larger force to a roller disposed approximately at one of said arcuate track end portions, the ratio of said larger force to said smaller force being at least approximately 4 to 1.

References Cited

UNITED STATES PATENTS

| | | | |
|---|---|---|---|
| 977,458 | 12/1910 | Lockwood | 308—214 |
| 997,921 | 7/1911 | Kliper | 308—214 |
| 1,389,385 | 8/1921 | Robson | 308—214 |
| 2,334,227 | 11/1943 | Stallman | 308—212 |
| 3,003,828 | 10/1961 | Stark | 308—6 |
| 3,101,978 | 8/1963 | Stallman | 308—6 |
| 3,241,890 | 3/1966 | Stallman | 308—6 |

MARTIN P. SCHWADRON, *Primary Examiner.*

L. L. JOHNSON, *Assistant Examiner.*